US012474672B2

(12) United States Patent
Reymond

(10) Patent No.: US 12,474,672 B2
(45) Date of Patent: Nov. 18, 2025

(54) MOON PHASE DISPLAY MECHANISM OF A TIMEPIECE

(71) Applicant: Blancpain SA, Le Brassus (CH)

(72) Inventor: Cédric Reymond, Les Bioux (CH)

(73) Assignee: Blancpain SA, Le Brassus (CH)

( * ) Notice: Subject to any disclaimer, the term of this patent is extended or adjusted under 35 U.S.C. 154(b) by 339 days.

(21) Appl. No.: 18/182,424

(22) Filed: Mar. 13, 2023

(65) Prior Publication Data

US 2023/0305495 A1 Sep. 28, 2023

(30) Foreign Application Priority Data

Mar. 28, 2022 (EP) ..................................... 22164771

(51) Int. Cl.
*G04B 19/26* (2006.01)

(52) U.S. Cl.
CPC .................................. *G04B 19/268* (2013.01)

(58) Field of Classification Search
CPC ...... G04B 19/268; G04B 19/00; G04B 13/02; G04B 19/26; G04B 19/262
USPC ...................................................... 368/14–20
See application file for complete search history.

(56) References Cited

U.S. PATENT DOCUMENTS 8,995,233 B2 3/2015 Goeller et al.
11,036,185 B2 6/2021 Zaugg et al.
2014/0112108 A1* 4/2014 Orny .................... G04B 19/247 368/18
2014/0126336 A1 5/2014 Goeller et al.
2018/0314209 A1* 11/2018 Saglini ................... G04B 19/25
2021/0208539 A1* 7/2021 Papi ..................... G04B 19/268

FOREIGN PATENT DOCUMENTS

CH 704 745 B1 10/2012
EP 2 728 420 A1 5/2014
JP 2014-92549 A 5/2014
RU 2 532 231 C1 10/2014

(Continued)

OTHER PUBLICATIONS

Office Action issued Mar. 26, 2024, in corresponding Japanese Patent Application No. 2023-047698 (with English Translation), 10 pages.

(Continued)

*Primary Examiner* — Edwin A. Leon
(74) *Attorney, Agent, or Firm* — Oblon, McClelland, Maier & Neustadt, L.L.P.

(57) ABSTRACT

A moon phase display mechanism for a timepiece capable of being driven by a horological movement, the operation whereof depends on the time division, the moon phase display mechanism including: a moon phase indicator carrying at least one representation of the moon; a jumping drive mechanism of the moon phase indicator capable of being driven by the horological movement and of driving, in jumps, the moon phase indicator; the moon phase display mechanism wherein the jumping drive mechanism is configured to rotate the moon phase indicator by n increments per day, n being greater than 1, each increment rotating the moon phase indicator by an angle α corresponding to the angle of rotation of a daily pitch divided by the number n of increments.

17 Claims, 2 Drawing Sheets

(56) References Cited

FOREIGN PATENT DOCUMENTS

| | | | |
|---|---|---|---|
| RU | 2 559 045 | C1 | 8/2015 |
| RU | 2 761 130 | C1 | 12/2021 |

OTHER PUBLICATIONS

Combined Russian Office Action and Search Report issued Nov. 27, 2023, in corresponding Russian Patent Application No. 2023107250/28(015844) (with English Translation of Category of Cited Documents), 9 pages.

European Search Report issued Jul. 26, 2022, in European Application 22164771.2 filed on Mar. 28, 2022, 3 pages (with English Translation of Categories of Cited Documents).

* cited by examiner

MOON PHASE DISPLAY MECHANISM OF A TIMEPIECE

CROSS-REFERENCE TO RELATED APPLICATION

This application claims priority to European Patent Application No. 22164771.2 filed on Mar. 28, 2022, the entire disclosure of which is hereby incorporated herein by reference.

TECHNICAL FIELD OF THE INVENTION

The field of the invention relates to moon phase display mechanisms of timepieces allowing information on the state of the moon during a complete lunation period to be displayed.

The invention further relates to a horological movement comprising such a moon phase display mechanism.

The invention further relates to a timepiece, for example a wristwatch, comprising a horological movement that comprises such a moon phase display mechanism.

TECHNOLOGICAL BACKGROUND

Moon phase display mechanisms allow information on the state of the moon during a lunation period to be displayed. This theoretical lunation period is precisely 29 days, 12 hours, 44 minutes and 2.8 seconds.

The most common moon phase display mechanisms are mechanisms with a jumping drive of a 59-toothed star-wheel carrying a disc with two representations of the moon, a part of this disc being visible to the user through a suitably shaped opening made in the dial of the watch and successively revealing the different phases of the moon: a waxing moon, a full moon, a waning moon and a new moon.

The 59-toothed star-wheel is driven once a day by a 24-hour wheel. Such a moon phase display mechanism procures a period of 29.5 days per lunation displayed, thus providing an approximate result with a reliable, space-saving and inexpensive mechanism. However, such a mechanism accumulates an error with each lunation which must be compensated for every 2.65 years by a correction device.

The search for a more precise moon phase display mechanism is constant in the horological field.

Most known moon phase display mechanisms aim to improve the precision of the lunation by getting as close as possible to the theoretical value of a lunation period, using a multitude of mechanisms and precise gear ratios to get as close as possible to the theoretical value of a lunation.

For example, more complex moon phase display mechanisms of the jumping type are known to provide a lunation of 29.53125 days, which reduces the correction to one day every 122.4 years.

Moon phase display mechanisms of the dragging type also exist, which further increase the precision of a lunation, allowing the correction to be reduced to one day every 292 years and 279 days, or even one day every 1866 years with complex and very large mechanisms.

The advantage of moon phase display mechanisms of the dragging type is that they procure a more precise, real-time display of the state of the moon over a day with respect to the lunar body. More specifically, with this type of mechanism, the moon is driven throughout the day, as opposed to a display mechanism of the jumping type, where the moon disc is driven by one jump a day.

As a result, the driving of the display in jumps leads to a "display error" in the state of the moon displayed, with respect to the lunar body, which is constantly changing throughout the day. This "display error" inherent to this type of jumping drive represents a maximum cumulative display error of 6.1° per day, regardless of the lunation precision of the moon phase display mechanism, however complex it may be.

SUMMARY OF THE INVENTION

In this context, the invention proposes a moon phase display mechanism of the jumping type having an improved display resolution compared to the moon phase display mechanisms of the prior art, allowing moon phase display mechanisms of the jumping type to reduce this "display error", to be truer to reality and to get closer to the state of the lunar body without complicating the display mechanism and while doing away with the need for a display mechanism of the dragging type which is costly, cumbersome, and complex to produce and implement.

To this end, the invention relates to a moon phase display mechanism for a timepiece capable of being driven by a horological movement, the operation whereof depends on the time division, said moon phase display mechanism comprising:

- a moon phase indicator carrying at least one representation of the moon;
- a jumping drive mechanism of the moon phase indicator capable of being driven by said horological movement and of driving, in jumps, the moon phase indicator;

the moon phase display mechanism being characterised in that the jumping drive mechanism is configured to rotate said moon phase indicator by n increments per day, n being greater than 1, each increment rotating the moon phase indicator by an angle α corresponding to the angle of rotation of a daily pitch divided by the number n of increments.

In addition to the features mentioned in the preceding paragraph, the moon phase display mechanism according to the invention can have one or more complementary features from among the following, considered either on an individual basis or according to any combination technically possible:

- the jumping drive mechanism comprises:
  - a cam comprising an upper area forming a driving finger-piece, said cam being capable of being driven by the horological movement;
  - a phase lever mounted such that it pivots about a pivot axis, said phase lever comprising, at one of the ends thereof, a feeler sensing the movements of the cam and comprising, at the other end thereof, a correction beak driving said moon phase indicator upon each passage of the upper area of the cam;
- the cam is rotated so as to make one complete rotation in 12 hours and the cam comprises a single upper area forming a driving finger-piece configured to pivot the phase lever and drive said moon phase indicator twice a day;
- the cam is rotated so as to make one complete rotation in 24 hours and the cam comprises two opposite upper areas at 180° from one another, forming two driving finger-pieces configured to pivot said phase lever and drive said moon phase indicator twice a day;
- said moon phase display mechanism is configured to procure a lunation period of 29.53125 days and the moon phase indicator is incremented twice a day by an angle of 3.05° so as to procure a daily rotation of 6.1°;

the cam is rotated such that it makes a complete rotation in 12 hours and the cam comprises two opposite upper areas at 180° from one another, forming two driving finger-pieces configured to pivot the phase lever and drive said moon phase indicator four times a day; said moon phase display mechanism being configured to procure a lunation period of 29.53125 days and in that the moon phase indicator is incremented four times a day by an angle of 1.525° so as to procure a daily rotation of 6.1°;

the jumping drive mechanism comprises a phase-driving intermediate wheel set rotated by the phase lever, said phase-driving intermediate wheel set meshing with the moon phase indicator;

the phase-driving intermediate wheel set comprises a phase-driving star-wheel configured to be rotated by the phase lever, and a phase-driving pinion integral with the phase-driving star-wheel such that it rotates therewith, said phase-driving pinion being meshed with a phase wheel comprised in the moon phase indicator;

the jumping drive mechanism comprises a jumper cooperating with the phase-driving intermediate wheel set for indexing and holding said phase-driving intermediate wheel set in position between each increment;

the moon phase display mechanism comprises a quick correction device that can be activated by the user to correct the position of the moon phase indicator;

the quick correction device comprises a correction star-wheel carried by the phase-driving intermediate wheel set and configured to be driven by a phase correction control;

the phase wheel has 109 teeth, the phase-driving pinion has 16 teeth and the phase-driving star-wheel has 18 teeth;

said correction star-wheel has 9 teeth;

the moon phase display mechanism comprises a safety device for disconnecting the jumping drive mechanism when a quick correction action, via said quick correction device, occurs at the same time as the moon phase indicator is being driven by the jumping drive mechanism.

The invention further relates to a horological movement comprising a moon phase display mechanism according to the invention.

Advantageously, the horological movement comprises a motion-work, an hour wheel, and a minute centre pinion, said moon phase display mechanism comprising a cam that comprises an upper area forming a driving finger-piece, said cam being driven by the rotation of the hour wheel.

Advantageously, the cam is positioned coaxially with the hour wheel and mounted to rotate freely relative to the hour wheel.

Advantageously, the cam comprises an indexing element extending towards the hour wheel and in that the hour wheel has a slot configured to receive the indexing element, said slot forming bankings limiting the relative rotation of the cam to the hour wheel.

The invention further relates to a timepiece comprising a moon phase display mechanism according to the invention or comprising a horological movement according to the invention.

Advantageously, the timepiece is a wristwatch.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

The present invention consists of the general idea of splitting the daily driving pitch of the moon phase indicator of a moon phase display mechanism of the jumping type in order to improve the resolution of the moon phase indicator displayed and to get as close as possible to the actual state of the lunar body during the day.

In the present application, "daily pitch" is understood to mean the daily angular pitch travelled by a moon phase indicator depending on the approximate lunation period of the moon phase display mechanism.

Figure 1:
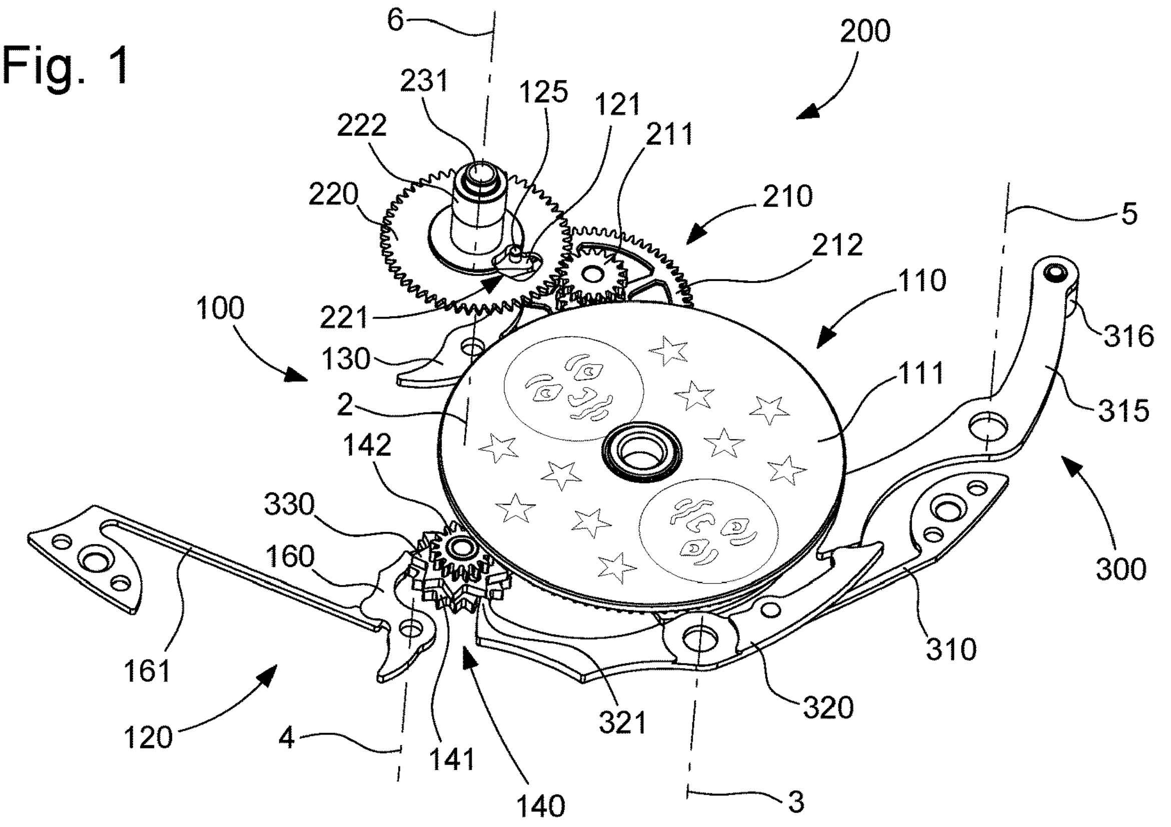
FIG. 1 shows a perspective view of an example embodiment of a moon phase display mechanism according to the invention.

FIG. 1 shows a perspective view of an example embodiment of a moon phase display mechanism 100 according to the invention.

Figure 2:
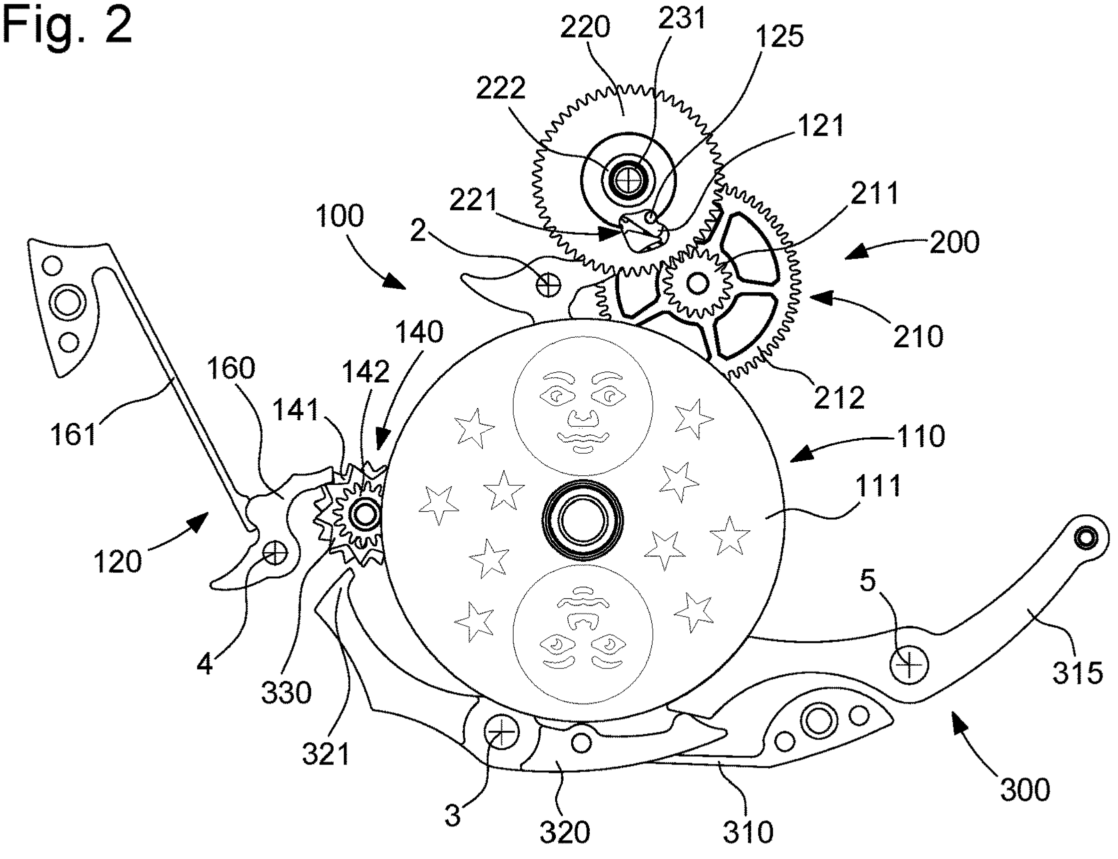
FIG. 2 shows a top view of the example embodiment of the moon phase display mechanism shown in FIG. 1.
Figure 3:
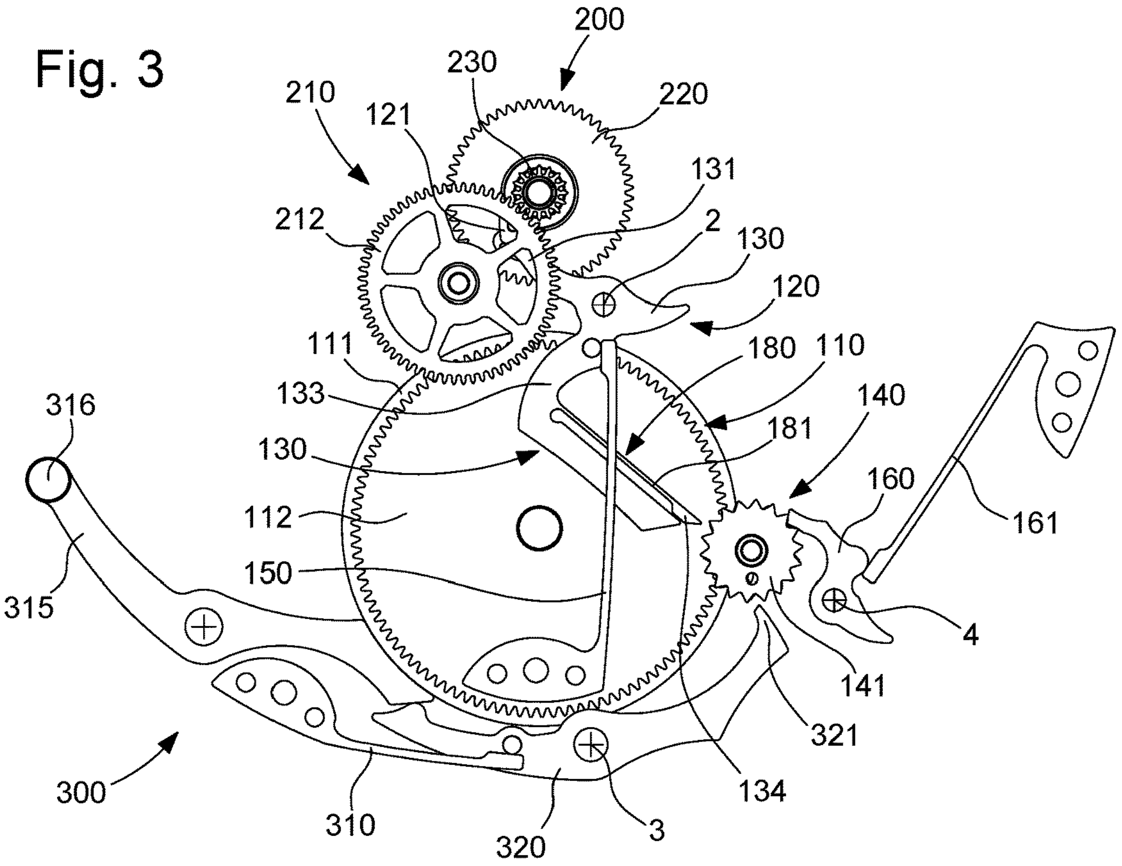
FIG. 3 shows a bottom view of the example embodiment of the moon phase display mechanism shown in FIG. 1.

FIG. 2 shows a top view of the example embodiment of the moon phase display mechanism 100 shown in FIG. 1, and FIG. 3 shows a bottom view of the same example embodiment.

The moon phase display mechanism 100 according to the invention is a display mechanism of the jumping type, i.e. the moon phase indicator carrying the moon representations is not continuously stressed by the gear train of a horological movement. Thus, such a mechanism is completely different, both functionally and structurally, from a moon phase display mechanism of the dragging type, wherein the moon phase indicator is constantly stressed by the gear train of the horological movement and driven thereby.

The moon phase display mechanism 100 according to the invention is intended to be housed in a timepiece, for example in a case of a wristwatch (not shown).

The moon phase display mechanism 100 according to the invention is driven by a horological movement 200, partially shown in FIGS. 1 to 3, i.e. by a mechanism whose functioning is dependent on the time division.

More specifically, the horological movement 200 in particular comprises a motion-work 210 comprising a minute pinion 211 and a minute wheel 212. The minute pinion 211 drives an hour wheel 220, and the assembly is configured so that the hour wheel 220 makes one complete revolution in 12 hours.

In the example embodiment shown in FIGS. 1 to 3, the hour wheel 220 is at the centre of the horological movement 200, and thus forms the centre wheel. The hour wheel 220 has a cylindrical area 222 carrying an hour hand (not shown). A minute hand (not shown) is carried by a cannon-pinion 231 of a minute centre pinion 230 mounted coaxially with the hour wheel 220. The minute centre pinion 230 meshes with the motion-work 210, and more particularly with the minute wheel 212.

The moon phase display mechanism 100 comprises a moon phase indicator 110, at least part whereof is intended to be visible to the user through a suitably shaped opening made in a dial of the timepiece (not shown), so as to successively reveal the different phases of the moon: a waxing moon, a full moon, a waning moon and a new moon.

The moon phase indicator 110 is set in motion by a jumping drive mechanism 120 driven at regular intervals by the horological movement 100 and/or by a user via a quick correction device 300.

The moon phase indicator 110 carries at least one representation of the moon. In the example shown, the moon phase indicator 110 comprises two representations of the moon.

In the example embodiment shown, the moon phase indicator 110 is formed by an upper disc 111 carrying the two representations of the moon. The upper disc 111 is mounted such that it is integral with a phase wheel 112 having a plurality of teeth.

The jumping drive mechanism 120 comprises a phase-driving element directly driven by the rotation of the hour wheel 220. The phase-driving element cooperates with a phase lever 130 which is mounted such that it pivots about a pivot axis 2. The phase lever 130 is pivoted by the phase-driving element such that it interacts with the moon phase indicator 110 and rotates same each time the phase lever 130 is tilted.

In the example embodiment shown in FIGS. 1 to 3, the phase-driving element is formed by a cam 121 driven directly by the horological movement 200. More particularly, the cam 121 is rotated directly by the hour wheel 220 and is mounted coaxially with the hour wheel 220.

In this first example embodiment, the cam 121 is inserted between the hour wheel 220 and the centre pinion 230; however other arrangements are also possible.

Figure 4:
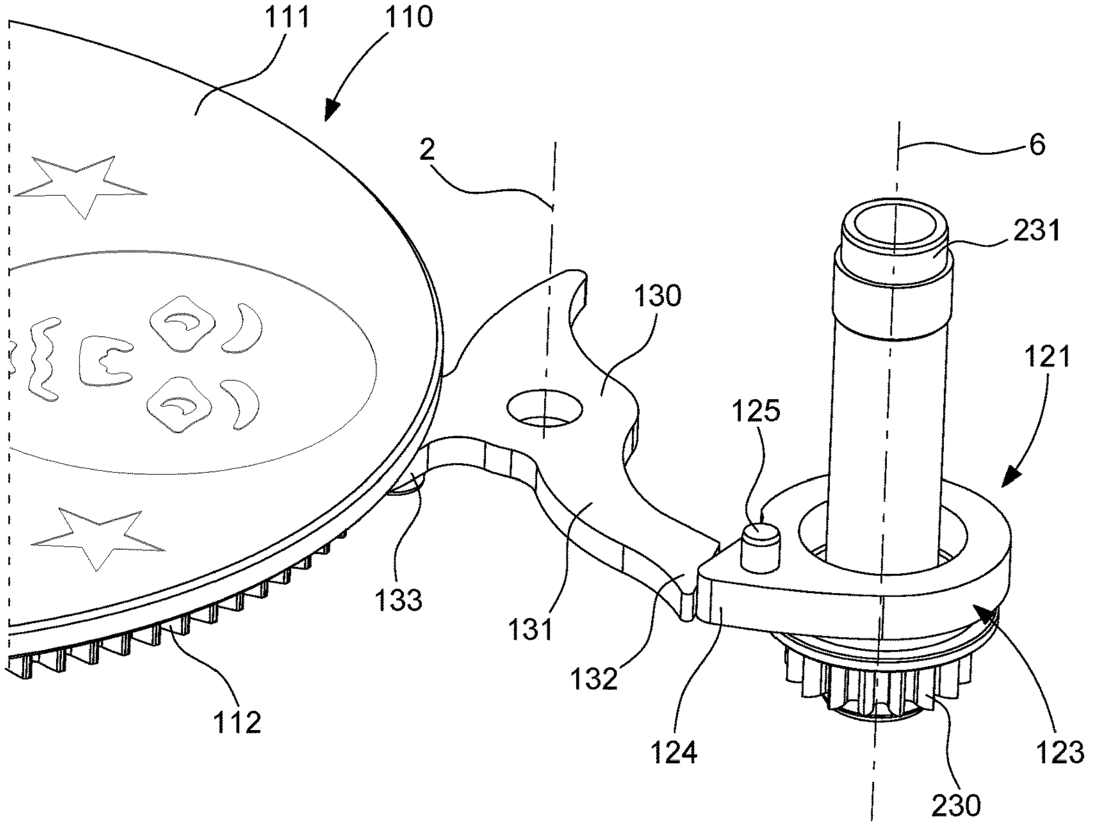
FIG. 4 shows a perspective view of a portion of a jumping drive mechanism of the moon phase display mechanism according to the invention.

FIG. 4 more particularly shows the cam 121, acting as a phase-driving element, mounted coaxially with the hour wheel 220 and the centre pinion 230. In this FIG. 4, the hour wheel 220 is not shown in order to better visualise the cam 121 and the interaction thereof with the phase lever 130.

The cam 121 is mounted to rotate freely about the axis of rotation 6 of the hour wheel 220.

The cam 121 delimits an outer profile 123 forming a sensing profile configured to interact with the phase lever 130. The outer profile 123 comprises an upper sensing area which is radially the furthest area from the axis of rotation 6 of the hour wheel 220. This upper sensing area forms a driving finger-piece 124 configured to come into contact with the phase lever 130 and tilt it when the cam 121 is rotating.

At this driving finger-piece 124, the cam 121 comprises a pin 125, or other indexing element, projecting from the upper surface of the cam 121, such that the pin 125 extends towards the hour wheel 220 located above the cam 121, so as to cooperate with the hour wheel 220.

The pin 125 is configured to be inserted into and cooperate with a slot 221 made in the body of the hour wheel 220. The slot 221 defines, thanks to the shape thereof, bankings which limit the relative rotation of the cam 121 to the hour wheel 220. Thus, when the pin 125 integral with the cam 121 comes to rest against the peripheral edges of the slot 221, the hour wheel 220 drives the cam 121 such that it rotates.

The relative rotation of the cam 121 to the hour wheel 220 in particular avoids stressing the hour wheel 220 when the phase lever 130 returns to its rest position under the resilience of the resilient means 150.

In this case, in the example embodiment shown in FIGS. 1 to 4, the cam 121 is a 12-hour cam since it comprises a single driving finger-piece and carries out a complete rotation in 12 hours, similar to the rotation of the hour wheel 220.

It goes without saying that other example embodiments are possible, and in particular intermediate wheels and ratios that are different from 1 relative to the hour wheel 220 and/or a cam profile with a plurality of upper areas forming driving finger-pieces 124 can be used to increase the number of times the phase lever 130 is tilted during one revolution of the hour wheel 220, i.e. in 12 hours.

The phase lever 130 is mounted such that it pivots about a pivot axis 2 and is tilted between a rest position and an activation position by the passage of the driving finger-piece 124 of the cam 121.

As shown in FIGS. 3 and 4, the phase lever 130 comprises a first arm 131 having, at the end thereof, a feeler 132 configured to cooperate with the one or more driving finger-pieces 124 of the cam 121. More particularly, the phase lever 130 tilts upon each passage of a driving finger-piece during the rotation of the cam 121 driven by the hour wheel 220.

The phase lever 130 further comprises a second arm 133 which comprises, at the end thereof, a correction beak 134 configured to rotate the moon phase indicator 110 each time the phase lever 130 is tilted.

The phase lever 130 cooperates with resilient return means 150, for example a return spring, biased to position the phase lever 130 in the rest position between each tilting.

For example, the phase lever 130 is repositioned against a positioning banking (not shown) which allows the rest position of the phase lever 130 to be defined. Such a positioning banking avoids, for example, any permanent contact of the feeler 132 on the outer profile 123 of the cam 121. This thus minimises contact between the different parts and reduces part wear.

The moon phase display mechanism 100 according to the invention operates as follows: the hour wheel 220 rotates in a clockwise direction, conventionally driven by the motion-work 210.

With each rotation of the hour wheel 220, the driving finger-piece 124 of the cam 121, stressed by the rotation of the hour wheel 220, via the pin 125 and the slot 221, comes into contact with the feeler 132 of the phase lever 130. The shapes and geometries of the driving finger-piece 124 of the cam 121 and of the feeler 132 of the phase lever 130 are configured to ensure that the phase lever 130 pivots as the cam 121 is rotated into the activation position thereof, allowing the moon phase indicator 110 to be incremented and angularly offset.

The moon phase display mechanism 100 according to the invention is configured so that the jumping drive mechanism 120 rotates the moon phase indicator 110 by n increments per day, n being greater than 1, each increment rotating the moon phase indicator 110 by an angle $\alpha$ corresponding to the angle of rotation of a daily pitch divided by the number n of increments.

For example, with the use of a 12-hour cam, the moon phase indicator 110 is incremented twice a day instead of only once a day as with the jumping-type display mechanisms of the prior art.

The different gear trains are dimensioned so that the overall rotation of the moon phase indicator 110 over a day remains identical to the daily pitch of a conventional moon phase indicator set in motion by a jumping drive mechanism of the prior art.

Thus, for a moon phase display mechanism 110 configured to obtain a lunation period of 29.53125 days, the moon phase indicator 110 according to the invention will be moved twice a day (every 12 hours) by an angle α of 3.05° to reach a daily pitch that corresponds to a rotation of 6.1°.

It goes without saying that the resolution of the moon state displayed by the moon phase display mechanism according to the invention could be further decreased, and thus the number of increments per day of the moon phase indicator 110 could be increased, while decreasing the angular jump of each increment, without further complicating the jumping drive mechanism 120.

This is possible, for example, by multiplying the number of driving finger-pieces 124 on the outer profile 123 of the cam 121, in order to tilt the phase lever 130 several times per revolution of the hour wheel 220, while configuring the different gear trains so that the overall rotation of the moon phase indicator 110 over one day remains identical to the daily drive pitch, in this case 6.1° for a lunation of 29.53125 days.

For example, the cam 121 can comprise two driving finger-pieces 124 opposite one another (i.e. 180° from one another), such that the phase lever 130 is tilted twice per revolution of the hour wheel 220, i.e. four times per day. Thus, the different gears are dimensioned such that each increment of the moon phase indicator 110, occurring every six hours in this case, corresponds to a rotation of the moon phase indicator 110 by an angle α of 1.525° so as to preserve an overall rotation of 6.1° per day corresponding to the daily pitch.

Such an alternative embodiment further improves the precision of the display of the state of the moon over a day in relation to the lunar body, although the daily pitch is still 6.1°.

In the example embodiment shown in FIGS. 1 to 4, the phase lever 130 does not cooperate directly with the phase wheel 112. More specifically, the jumping drive mechanism 120 comprises a phase-driving intermediate wheel set 140 located between the phase lever 130 and the moon phase indicator 110, and more particularly the phase wheel 112.

According to an alternative embodiment not shown, the phase lever 130 drives the phase wheel 112 directly, without the use of a phase-driving intermediate wheel set.

More particularly, the phase-driving intermediate wheel set 140 comprises a phase-driving star-wheel 141 integral such that it rotates with a phase-driving pinion 142 meshing with the phase wheel 112 of the moon phase indicator 110.

The phase-driving star-wheel 141 cooperates with a jumper 160 configured to hold the phase-driving star-wheel 141 in position between each jump (or increment) of the phase-driving star-wheel 141 operated by the phase lever 130.

The jumper 160 is capable of moving about a pivot axis 4 and conventionally cooperates with a resilient means 161 biased to position the jumper 161 between two teeth of the phase-driving star-wheel 141, once the high point of a tooth has passed under the effect of the phase lever 130.

Advantageously, the jumper 160 does not act directly on the phase wheel 112 but on the phase-driving intermediate wheel set 140, and more particularly on the phase-driving star-wheel 141. The use of such an architecture in particular allows the inertia of a moon phase indicator 110 of large dimensions to be absorbed.

The moon phase display mechanism 100 according to the invention further comprises an independent quick correction device 300 for correcting the position of the moon phase indicator 110 where necessary, for example after the horological movement 200 has been shut down for an extended period.

The quick correction device 300 comprises a correction star-wheel 330 carried by the phase-driving intermediate wheel set 140, and integral with the phase-driving pinion 142 such that it rotates therewith, such that an action on the correction star-wheel 330 generates a rotation of the moon phase indicator 110.

The quick correction device 300 further comprises a phase correction control 315 that can be operated by a user via a push-button, or an actuating stud 316. The phase correction control 315 is mounted such that it pivots about a pivot axis 5.

The phase correction control 315 cooperates with an intermediate phase correction lever 320 mounted such that it pivots about a pivot axis 3. The intermediate phase correction lever 320 comprises a correction beak 321 intended to cooperate with a tooth of the correction star-wheel 330 when the phase correction control 315 is operated by the user.

The quick correction device 300 comprises a resilient means 310 configured to reposition the phase correction control 315 and the intermediate phase correction lever 320 to neutral rest positions when the user is not operating the phase correction control 315.

In the example embodiment shown, the resilient means 310 bears against the intermediate phase correction lever 320. However, the resilient means 310 can bear against the phase correction control 315.

According to an alternative embodiment, the phase correction control 315 can act directly on the phase correction star-wheel 330, such that the intermediate phase correction lever 320 can be omitted.

In the example embodiment shown:

the cam is a 12-hour cam activating the phase lever 130 every 12 hours, i.e. upon each rotation of the hour wheel 220;

the phase wheel 112 has 105 teeth;

the phase-driving pinion, which is meshed with the phase wheel 112, has 16 teeth;

the phase-driving star-wheel 141 has 18 teeth;

the correction star-wheel has 9 teeth (i.e. half as many teeth as the phase-driving star-wheel 141).

Thus, the gear ratio from the hour wheel 220 is 105*9/16=59.0625, which corresponds to a lunation period of 29.53125 since the phase indicator 110 comprises two representations of the moon.

In this configuration, the moon phase indicator 110 is incremented twice a day by an angle of 3.05° so as to procure a daily rotation of 6.1°.

In the example embodiment shown in FIGS. 1 to 4, the correction star-wheel 330 advantageously has half as many teeth as the phase-driving star-wheel 140, since the latter is incremented twice a day. Thus, the quick correction device 300 allows for corrections equivalent to one day's driving (daily pitch). Such a configuration advantageously does not change the habits of the wearer who is used to making a one-day correction each time the correction control is operated.

Since the correction star-wheel 330 has 9 teeth and the phase-driving star-wheel 141 has twice as many teeth, the correction star-wheel 330 can have two different indexing positions depending on the position of the phase-driving star-wheel 141 relative to the jumper 160 thereof. Thus, for the two indexing positions of the correction star-wheel 330, the distance between a tooth of the correction star-wheel 330 and the correction beak is different, and thus the action of the correction beak of the intermediate lever is different depending on the indexing position of the correction star-wheel 330.

Depending on the time of day at which the quick correction takes place, and thus depending on the indexing position of the correction star-wheel 330, actuation of the correction control 315 can put the correction star-wheel 330 forward by a full daily pitch (in this case a rotation of 6.1°), each time the correction control 315 is operated, or firstly by half a daily pitch, i.e. a rotation of 3.05° (in the case of two indexings of the phase-driving star-wheel 141 per day and if the first indexing in the first twelve hours of the day is carried out), then by a full daily pitch (rotation of 6.1°) each time the correction control 315 is operated.

The moon phase display mechanism 100 further comprises a safety device 180 allowing the jumping drive mechanism 120 to be disconnected when a quick correction is carried out by the user, via the quick correction device 300 which acts on the same phase-driving intermediate wheel set 140. The safety device 180 allows the jumping drive mechanism 120 to be disconnected when a quick correction action occurs at the same time as the moon phase indicator 110 is being driven by the phase lever 130.

For example, as shown in FIGS. 1 to 4, the safety device 180 is formed by a pawl made on the phase lever 130.

More particularly, the pawl is made at the second arm 132 such that the correction beak 134, cooperating with the phase-driving intermediate wheel set 140, is located at the end of a resilient strand 181 capable of disconnecting when a correction action is engaged by the user via the quick correction device 300 causing the phase-driving intermediate wheel set 140 to rotate.

Thus, when the correction beak 134 is in contact with the phase-driving intermediate wheel set 140 and a simultaneous quick correction action is engaged, the resilience of the resilient strand 181 allows the correction beak to be released from the engagement thereof with the phase-driving star-wheel 141 and allows the phase-driving intermediate wheel set 140 to rotate without the risk of breakage or damage to the jumping drive mechanism 120.

In the example embodiment described in FIGS. 1 to 4, the cam forming the phase-driving element is coaxial with the hour wheel 220. However, other example embodiments are possible.

For example, the cam forming the phase-driving element can be carried by an intermediate wheel directly meshed with the hour wheel 220.

The intermediate wheel can be configured to have a ratio of 1 with the hour wheel 220 or a ratio other than 1.

For example, by decreasing the ratio of the hour wheel 220 to the intermediate wheel, the resolution of the moon phase indicator 110 displayed over a day can be increased as described above, i.e. the number of increments of the moon phase indicator 110 can be increased, while decreasing the angular jump of each increment in order to keep with the overall rotation over a day that corresponds to the daily angular pitch corresponding to the lunation period of the moon phase display mechanism 100.

For example, with a ratio of 0.5 between the hour wheel 220 and the intermediate wheel carrying the cam, the intermediate wheel makes one revolution in 6 hours, i.e. two revolutions in 12 hours. Thus, with a cam having a single driving finger-piece, the daily angular pitch of the moon phase indicator 110 can be split into four increments spread over the day, i.e. every 6 hours.

With the same ratio of 0.5 between the hour wheel 220 and the phase-driving intermediate wheel and with a cam carrying two opposite driving finger-pieces at 180° from one another, the daily angular pitch of the moon phase indicator 110 can be split into eight increments spread over the day, i.e. every 3 hours.

It goes without saying that whichever embodiment is chosen, the gear ratios between the phase wheel 112, the phase-driving pinion 142, and the phase-driving star-wheel 141 will be adapted to split the overall daily rotation of the moon phase indicator 110 corresponding to the daily pitch according to the number of increments desired.

It goes without saying that one or more intermediate wheels can also be used between the hour wheel 23 and the phase-driving wheel 110 as required.

According to another example embodiment, the phase-driving element can be formed by a plurality of superimposed cams interacting in phase levers positioned on different levels of the mechanism, in order to multiply the increments of the moon phase indicator 110 over a day.

The invention further relates to a horological movement 200 comprising a moon phase display mechanism 100 according to the invention.

The invention further relates to a timepiece, such as a wristwatch, comprising a horological movement 200 according to the invention.

The invention claimed is:

1. A moon phase display mechanism for a timepiece capable of being driven by a horological movement, an operation thereof depends on a time division, said moon phase display mechanism comprising:
- a moon phase indicator carrying at least one representation of the moon;
- a jumping drive mechanism of the moon phase indicator capable of being driven by said horological movement and of driving, in jumps, the moon phase indicator;
- wherein the jumping drive mechanism is configured to rotate said moon phase indicator by n increments per day, n being greater than 1, each increment rotating the moon phase indicator by an angle α corresponding to an angle of rotation of a daily pitch divided by a number n of increments,
- wherein the jumping drive mechanism comprises:
  - a cam comprising an upper area forming a driving finger-piece, said cam being capable of being driven by the horological movement;
  - a phase lever mounted such that it pivots about a pivot axis, said phase lever comprising, at one of the ends thereof, a feeler sensing the movements of the cam and comprising, at the other end thereof, a correction beak driving said moon phase indicator upon each passage of the upper area of the cam;
  - a phase-driving intermediate wheel set rotated by the phase lever, said phase-driving intermediate wheel set meshing with the moon phase indicator; and
  - a jumper cooperating with the phase-driving intermediate wheel set for indexing and holding said phase-driving intermediate wheel set in position between each increment,
- wherein said phase-driving intermediate wheel set comprises a phase-driving star-wheel configured to be rotated by the phase lever, and a phase-driving pinion integral with the phase-driving star-wheel such that it rotates therewith, said phase-driving pinion being meshed with a phase wheel comprised in the moon phase indicator.

2. The moon phase display mechanism for a timepiece according to claim 1, wherein the cam is rotated so as to make one complete rotation in 12 hours and wherein the cam comprises a single upper area forming a driving finger-piece configured to pivot the phase lever and drive said moon phase indicator twice a day.

3. The moon phase display mechanism for a timepiece according to claim 1, wherein the cam is rotated so as to make one complete rotation in 24 hours and wherein the cam comprises two opposite upper areas at 180° from one another, forming two driving finger-pieces configured to pivot said phase lever and drive said moon phase indicator twice a day.

4. The moon phase display mechanism for a timepiece according to claim 2, wherein said moon phase display mechanism is configured to procure a lunation period of 29.53125 days and wherein the moon phase indicator is incremented twice a day by an angle of 3.05° so as to procure a daily rotation of 6.1°.

5. The moon phase display mechanism for a timepiece according to claim 3, wherein said moon phase display mechanism is configured to procure a lunation period of 29.53125 days and wherein the moon phase indicator is incremented twice a day by an angle of 3.05° so as to procure a daily rotation of 6.1°.

6. The moon phase display mechanism for a timepiece according to claim 1, wherein the cam is rotated such that it makes a complete rotation in 12 hours and wherein the cam comprises two opposite upper areas at 180° from one another, forming two driving finger-pieces configured to pivot the phase lever and drive said moon phase indicator four times a day; said moon phase display mechanism being configured to procure a lunation period of 29.53125 days and wherein the moon phase indicator is incremented four times a day by an angle of 1.525° so as to procure a daily rotation of 6.1°.

7. The moon phase display mechanism for a timepiece according to claim 1, wherein said moon phase display mechanism comprises a quick correction device that can be activated by the user to correct the position of the moon phase indicator.

8. The moon phase display mechanism for a timepiece according to claim 7, wherein said quick correction device comprises a correction star-wheel carried by the phase-driving intermediate wheel set and configured to be driven by a phase correction control.

9. The moon phase display mechanism for a timepiece according to claim 1, wherein said phase wheel has 109 teeth, the phase-driving pinion has 16 teeth and wherein the phase-driving star-wheel has 18 teeth.

10. The moon phase display mechanism for a timepiece according to claim 8, wherein said correction star-wheel has 9 teeth.

11. The moon phase display mechanism for a timepiece according to claim 7, wherein the moon phase display mechanism comprises a safety device for disconnecting the jumping drive mechanism when a quick correction action, via said quick correction device, occurs at the same time as the moon phase indicator is being driven by the jumping drive mechanism.

12. The horological movement comprising the moon phase display mechanism according to claim 1.

13. The horological movement according to claim 12, wherein it comprises a motion-work, an hour wheel, and a minute centre pinion, said moon phase display mechanism comprising a cam that comprises an upper area forming a driving finger-piece, said cam being driven by the rotation of the hour wheel.

14. The horological movement according to claim 13, wherein the cam is positioned coaxially with the hour wheel and mounted to rotate freely relative to the hour wheel.

15. The horological movement according to claim 14, wherein the cam comprises an indexing element extending towards the hour wheel and wherein the hour wheel has a slot configured to receive the indexing element, said slot forming bankings limiting the relative rotation of the cam to the hour wheel.

16. The timepiece comprising the moon phase display mechanism according to claim 1.

17. The timepiece according to claim 16, wherein said timepiece is a wristwatch.

* * * * *